(12) United States Patent
Toledo Antonio et al.

(10) Patent No.: US 9,776,174 B2
(45) Date of Patent: Oct. 3, 2017

(54) PROCESS FOR PREPARING A CATALYTIC COMPOSITION FOR THE HYDROCONVERSION OF PETROLEUM FRACTIONS

(71) Applicant: Instituto Mexicano del Petroleo, Mexico, C.P. (MX)

(72) Inventors: Jose Antonio Toledo Antonio, Mexico City (MX); Miguel Perez Luna, Mexico City (MX); Maria Antonia Cortes Jacome, Mexico City (MX); Jose Escobar Aguilar, Mexico City (MX); Maria de Lourdes Mosqueira Mondragon, Mexico City (MX); Carlos Angeles Chavez, Mexico City (MX); Esteban Lopez Salinas, Mexico City (MX); Victor Perez Moreno, Mexico City (MX); Gerardo Ferrat Torres, Mexico City (MX); Rodolfo Juventino Mora Vallejo, Mexico City (MX); Marcelo Lozada Y Cassou, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 0 days.

(21) Appl. No.: 14/560,983

(22) Filed: Dec. 4, 2014

(65) Prior Publication Data
US 2015/0087502 A1    Mar. 26, 2015

Related U.S. Application Data

(62) Division of application No. 12/065,116, filed as application No. PCT/MX2006/000091 on Aug. 22, 2006, now Pat. No. 8,946,110.

(30) Foreign Application Priority Data

Aug. 31, 2005  (MX) ................... PA/a/2005/009283

(51) Int. Cl.
| | | |
|---|---|---|
| B01J 27/20 | (2006.01) | |
| B01J 27/051 | (2006.01) | |
| B01J 23/85 | (2006.01) | |
| B01J 23/882 | (2006.01) | |
| B01J 23/883 | (2006.01) | |
| B01J 35/00 | (2006.01) | |
| B01J 37/00 | (2006.01) | |
| B01J 37/03 | (2006.01) | |
| B01J 37/08 | (2006.01) | |
| B01J 37/20 | (2006.01) | |
| C10G 45/08 | (2006.01) | |
| C10G 45/50 | (2006.01) | |
| B01J 35/10 | (2006.01) | |

(52) U.S. Cl.
CPC ........... *B01J 27/0515* (2013.01); *B01J 23/85* (2013.01); *B01J 23/882* (2013.01); *B01J 23/883* (2013.01); *B01J 35/002* (2013.01); *B01J 37/0018* (2013.01); *B01J 37/03* (2013.01); *B01J 37/084* (2013.01); *B01J 37/20* (2013.01); *C10G 45/08* (2013.01); *C10G 45/50* (2013.01); *B01J 35/1014* (2013.01); *B01J 35/1019* (2013.01); *B01J 35/1038* (2013.01); *B01J 35/1061* (2013.01)

(58) Field of Classification Search
None
See application file for complete search history.

(56) References Cited

U.S. PATENT DOCUMENTS

| | | |
|---|---|---|
| 2,853,257 A | 9/1958 | Cook |
| 4,243,554 A | 1/1981 | Naumann et al. |
| 4,448,896 A | 5/1984 | Kageyama et al. |
| 4,508,847 A | 4/1985 | Chianelli et al. |
| 4,514,517 A | 4/1985 | Ho et al. |
| 4,528,089 A | 7/1985 | Pecoraro et al. |
| 4,581,125 A | 4/1986 | Stiefel et al. |
| 4,650,563 A | 3/1987 | Jacobson et al. |
| 5,089,462 A | 2/1992 | Wilson et al. |
| 6,156,693 A | 12/2000 | Song et al. |

(Continued)

FOREIGN PATENT DOCUMENTS

| | | |
|---|---|---|
| EP | 0448117 | 9/1991 |
| EP | 0469675 | 2/1992 |

(Continued)

OTHER PUBLICATIONS

Mazzocchia et al., On the NiMoO4 oxidative dehydrogenation of propane to propene: some physical correlations with the catalytic activity, Catalysis Letters 10 (1991) 181-192.

(Continued)

*Primary Examiner* — Melvin C Mayes
*Assistant Examiner* — Colette Nguyen
(74) *Attorney, Agent, or Firm* — Dickinson Wright PLLC

(57) ABSTRACT

The invention relates to a method of preparing a catalytic composition comprising at least one non-noble metal from group VIII and at least one metal from group VIB of the periodic table. The invention also relates to the catalytic composition thus produced, which has a high specific activity in reactions involving the hydroprocessing of light and intermediate fractions, preferably in reactions involving the hydrotreatment of hydrocarbon streams, including hydrodesulphurisation (HDS), hydrodenitrogenation (HDN) and hydro-dearomatisation (HDA).

15 Claims, 2 Drawing Sheets

(56) References Cited

U.S. PATENT DOCUMENTS

Figure 1:
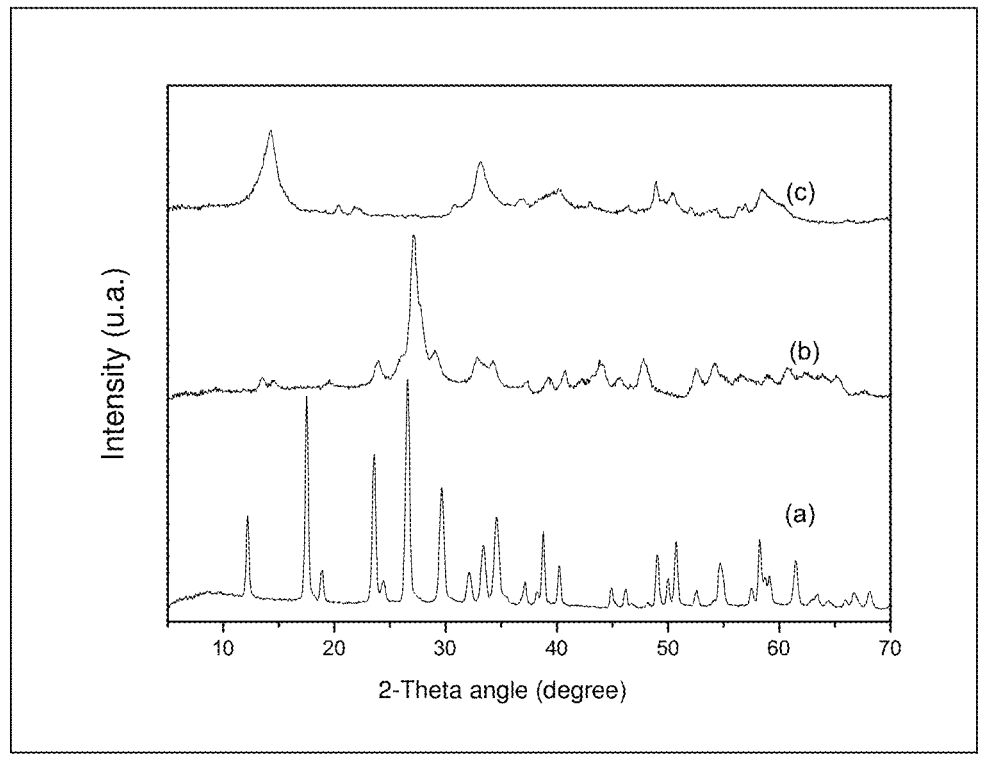

| | | | |
|---|---|---|---|
| 6,156,696 | A | 12/2000 | Albers et al. |
| 6,162,350 | A | 12/2000 | Soled et al. |
| 6,534,437 | B2 | 3/2003 | Eijsbouts et al. |
| 6,566,296 | B2 | 5/2003 | Plantenga et al. |
| 6,582,590 | B1 | 6/2003 | Riley et al. |
| 6,635,599 | B1 * | 10/2003 | Eijsbouts ............... B01J 23/85 502/219 |
| 6,783,663 | B1 | 8/2004 | Riley et al. |
| 6,860,987 | B2 | 3/2005 | Plantenga et al. |
| 2003/0111391 | A1 * | 6/2003 | Bhan ..................... B01J 23/85 208/253 |
| 2004/0248726 | A1 | 12/2004 | Zanibelli et al. |
| 2005/0059545 | A1 | 3/2005 | Alonso et al. |

FOREIGN PATENT DOCUMENTS

| | | | |
|---|---|---|---|
| NL | WO02/04117 | * | 1/2002 |
| WO | 0204117 | | 1/2002 |
| WO | 0204118 | | 1/2002 |
| WO | 04000456 | | 12/2003 |

OTHER PUBLICATIONS

Mazzocchia et al., Thermal activation of typical oxidative dehydrogenation catalyst precursors belonging to the Ni—Mo—O system, Journal of Thermal Analysis, vol. 40 (1993) 1253-1265.

Astier et al., Nickel-molybdenum catalysts prepared by reduction of ammonium triammine tetranickel pentamolybdate, Applied Catalysis, 72 (1991) 321-329.

Mazzocchia et al., On the NiO, MoO3 mixed oxide correlation between preparative procedures thermal activation and catalytic properties, Solid State Ionics 63-65 (1993) 731-735.

Berhault et al., The role of structural carbon in transition metal sulfides hydrotreating catalysts, Journal of Catalysis 198, 9-19 (2001).

Farag, Effect of sulfication temperatures on the bulk structures of various molybdenum precursors, Energy & Fuels 2002, 16, 944-950.

Scott, R. et al., Synthesis of Metal Sulfide Materials With Controlled Architecture, Current Opinion in Solid State and Materials Science 4 (1999) 113-121.

* cited by examiner

PROCESS FOR PREPARING A CATALYTIC COMPOSITION FOR THE HYDROCONVERSION OF PETROLEUM FRACTIONS

TECHNICAL FIELD OF THE INVENTION

This invention is related to a process for preparing a catalytic composition that is made up of at least one Group VIII non-noble metal and at least one Group VIB metal in the periodic table. The catalytic composition, also an object of this invention, presents a high specific activity in light and intermediate fraction hydroprocessing reactions, preferably in hydrotreatment reactions of hydrocarbon streams, amongst which can be found hydrodesulfurization (HDS), hydrodenitrogenation (HDN), and hydrodearomatization (HDA).

BACKGROUND OF THE INVENTION

Environmental protection government agencies demand more and more fuels with a lower content of precursor components to atmospheric contamination such as sulfur and nitrogen, and low contents of nickel and vanadium metals, among others. In addition, in order to take maximum advantage of the oil reserves, it is necessary to process heavier and heavier loads, and the content of said pollutants is increased in the fuels produced; therefore, it is necessary to develop new catalytic processes and materials that eliminate these pollutants from the hydrocarbons or fossil fuels in a more efficient manner, in order to minimize the gaseous emissions polluting the atmosphere, and thus comply with the ecological regulations that are becoming more and more strict.

The most efficient industrial processes for the removal of fossil fuel pollutants are the hydroconversion processes which are applied to practically all fractions of petroleum such as: gasoline, diesel, feedstock for catalytic cracking (FCC), and intermediate distillates. For the specific case of this invention, light and intermediate petroleum fractions are considered to be those that make up hydrocarbons whose boiling points are equal to or less than 180° C., and intermediate petroleum fractions that make up hydrocarbons whose boiling points are equal to or greater than 180.1° C. and less than or equal to 400° C.

In the hydroconversion processes, the light and intermediate petroleum fractions are hydrotreated and/or hydrodcracked in the presence of hydrogen. The hydroconversion processes include all of the processes in which a fraction of hydrocarbons reacts with hydrogen at high temperature and pressure, such as: hydrogenation, hydrodesulfurization, hydrodenitrogenation, hydrodemetalization, hydrodearomatization, hydroisomerization, and hydrocracking.

Likewise, the catalysts that are used are mainly made up of at least one Group VIII non-noble metal and at least one Group VIB metallic component in the periodic table, deposited on a high specific surface area support made up of metallic oxides such as alumina, silica, titania, and/or their blends, optionally containing secondary promoters or additives such as halogens, phosphorus, boron, etc. The catalysts are generally prepared by impregnation of the support with aqueous solutions containing the metal compounds in question followed by drying and calcination procedures. The catalyst preparation procedures for hydroprocessing have been addressed in the American patents U.S. Pat. No. 5,089,462 and U.S. Pat. No. 2,853,257, and the European patents EP 0,448,117 and EP 0,469,675.

The commonly used supports are based on a refractory material made up of alumina. The molybdenum-alumina catalysts promoted with cobalt are used preferably when the process required is that of hydrodesulfurization, while the molybdenum-alumina catalysts promoted with nickel are widely used when, in addition to hydrodesulfurization, hydrodenitrogenation and hydrogenating aromatics (hydrodearomatization), are required in the fraction that must be hydroprocessed due to the high hydrogenating activity inherent to the nickel.

The most relevant advances that have been achieved recently with respect to catalysts for hydrodesulfurization and hydrodenitrogenation, and in catalysts for hydroprocessing in general, are based on cobalt or nickel molybdenum-tungsten unsupported phases (U.S. Pat. No. 6,534,437, U.S. Pat. No. 6,582,590). These bulk catalysts of Ni—Mo—W—O or Co—Mo—W—O, present high specific areas made up between 100 and 200 m$^2$/g. The hydrodesulfurizing activity of these catalysts was measured with a molecule model of dibenzothiophene (DBT). These catalysts present a specific activity in [molecules/g*s] superior to the activity of the conventional catalysts supported on alumina. These catalysts present a high density, so a greater quantity of material fits into one unit of reactor volume. Thus, the activity measured with respect to the catalyst's volume turns out to be around four times higher compared to the commercially available conventional catalysts of nickel-molybdenum supported on alumina.

The synthesis of unsupported catalysts based on metals from Groups VIII and VIB in the periodic table has been carried out previously, (Catal. Lett. 10 (1991)181; J. Thermal Anal. 40 (1993) 1253). These catalysts have generally been focused toward the oxidation of hydrocarbons, for example, oxidative propane dehydrogenation and/or the partial oxidation of propylene into acrolein and acrylic acid. The ammonia phase precipitation from NiMoO$_4$.mNH$_3$, .nH$_2$O is known. This precipitation procedure has been applied recently to the preparation of catalysts for hydrodesulfuration and hydrotreatment of different petroleum fractions.

To date, the proposed structure for the precipitate formed from the ammonia complex is an ammonium nickel molybdate phase with a hydrotalcite-like structure which corresponds to the stoichiometric formula (NH$_4$)HNi$_2$(OH)$_2$(MoO$_4$)$_2$. This material presents a laminar structure that contains the molybdate anions in the interlaminar regions bonded with nickel hydroxide laminae. The procedure used for the synthesis of this type of materials is described in Appl. Catal. 72, 321-329 (1991) and Solid State Ionics 63-65 (1993) 731-35.

In the American patents U.S. Pat. No. 6,156,696B and U.S. Pat. No. 6,162,350B, procedures for the preparation of a catalytic composition, which is made up of at least one Group VIII non-noble metal that can be nickel or cobalt, and at least two Group VIB metals, which can be molybdenum and tungsten, are described. The general formula described is $(X)_b(Mo)_c(W)_dO_z$, where x is a Group VIII non-noble metal (Ni or Co) and the molar ratio b/(c+d) takes values of 0.5 to 3, and z=[2b+6(c+d)]2. These materials present an x-ray diffraction pattern characteristic of an amorphous material, with very wide peaks at a distance of 2.53 and 1.7 angstroms. The substitution of molybdenum atoms for tungsten atoms in the material allows it to obtain an amorphous or microcrystalline structure that upon being calcined crystallizes into a unknown structure and that is characterized because it presents a diffraction peak of 53.82° at position 2-theta, with a width halfway up the peak that goes from 1.3 to 1.7°. In order to achieve an optimal yield in the precipitation of the salts used, it is necessary that at least one of the salts be partially dissolved during the precipitation. The catalysts obtained are mixed with alumina and extruded, presenting high hydrodesulfuration and hydrodenitrogenation activity in hydrotreatment reactions from different petroleum fractions.

Another strategy that has been employed for the synthesis of bulk catalysts for hydrodesulfuration is through the thermal decomposition of ammonium thiometallate. U.S. Pat. No. 4,243,554 claims molybdenum disulfide catalysts promoted with cobalt and nickel with high specific area that can be obtained through the thermal decomposition of several thiomolybdate ammonium salts that have the formula $(NH_4)_2[MoO_xS_{4-x}]$, where x is 2. The decomposition of the thiosalts occurs in the presence of a hydrocarbon solution that contains sulfur compounds with a high pressure of hydrogen and at temperatures between 300 and 800° C.

On the other hand, the decomposition of these salts in the presence of a hydrocarbon generates a kind of molybdenum sulfide based catalyst containing carbon, which, in some manner, turns out to be responsible for the generation of active sites and for the high hydrodesulfurating activity of these materials (Berhault et. al. J. Catal. 198, 9-19 (2001)). U.S. Pat. No. 4, 508,847 reveals a catalytic composition of $MoS_{2-x}C_z$ where z is the carbon content and varies between $0.01<z<3$, and x is the sulfur content and varies between $0.01<x<0.5$. This catalyst is obtained through the exposure of a molybdenum precursor such as ammonium thiomolybdate or ammonium thiotungstate; ammonium molybdate or ammonium tungstate—thiomolybdates, molybdates, thiotungstates, ammonium tungstate substitutes—with a stream composed of sulfur, hydrogen, and hydrocarbons at temperatures between 150 and 600° C. The catalysts present high specific surface areas and can be promoted with other metals like cobalt and/or nickel to produce high-activity catalysts in hydrotreatment reactions, higher than the catalysts with similar metals supported on alumina. However, in the procedure described in this patent, the main source of carbon comes from the carbonization of the hydrocarbon present during the precursor's decomposition.

The addition of an organic compound as a carbon source to the inorganic molybdenum salts, or the direct sulfiding of organic salts from molybdenum, not only promotes the formation of metal carbide sulfide species, such as $MoS_xC_z$, but also favors the complete sulfiding of molybdenum to $MoS_2$, which can generate a greater density of active sites in the catalyst (Farag H. Energy & Fuel, 16 (2002) 944-950). Such is the case in U.S. Pat. No. 4,528,089 and U.S. Pat. No. 4,650,563 that reveal a procedure for obtaining a molybdenum disulfide catalyst containing carbon that consists of the thermal treatment of a precursor salt in the presence of sulfur and under oxygen-free conditions. The precursor salt has a general formula of $ML(Mo_xW_{1-x}S_4)$ where M is one or more divalent promoter metals, such as Ni, Co, Zn, Cu, or a mixture of them; x varies between 0 and 1; and L is one or more neutral organic complexes that can act as chelating polydentate ligands that contain nitrogen. The catalysts obtained this way present high activity in hydrotreatment reactions, superior to the catalysts obtained with conventional precursors such as cobalt-molybdenum on alumina, even when their specific area did not turn out very high.

U.S. Pat. Nos. 4,581,125 and 4,514,517 refer to a molybdenum disulfide catalyst that is obtained through the thermal decomposition of a precursor salt that contains carbon that can be $(NR_4)_2[M(WS_4)_2]$ or $(NR_4)_x[M(MoS_4)_2]$. The thermal decomposition occurs in an oxygen-free atmosphere in the presence of sulfur and hydrogen at a temperature greater than 150° C. The $(NR_4)$ group contains carbon, and is an ammonium cation substitute where R can be an alkyl or an aryl group. M is the metal promoter and is in close interaction through covalent bonds with the anion $(MoS_4)^=$ or $y(WS_4)^=$, and can be nickel, cobalt, or iron; x is 2 if M is nickel, and y is 3 if M is cobalt or iron. Ideally, the catalyst should be formed in the presence of hydrocarbons in order to obtain its maximum catalytic performance.

In order to increase the specific area of the catalysts obtained from the thiosalt decomposition, U.S. Pat. No. 6,156,693 describes a hydrothermal treatment procedure for the ammonium tetrathiomolybdate precursor salt, which is dissolved in a solvent with a high boiling point and water under hydrogen pressure at temperatures between 350 and 400° C. The presence of water is effective for the generation of active sites; however, this should be eliminated after the ammonium tetrathiomolybdate decomposition in order to give way for a more active $MoS_2$ catalyst.

Patent US 2005/0059545 A1 describes a procedure for obtaining molybdenum sulfide-based catalysts and/or tungsten-based catalysts containing carbon through a hydrothermal procedure. This procedure consists in treating an ammonium tetrathiomolybdate precursor salt, $A_xMoS_4$, where A is the ammonium ion, a tetraalkylammonium ion (x=2), or a diamine ion (x=1) in the presence of a promoter salt that can be nickel, cobalt, iron, or ruthenium, under hydrothermal conditions. The catalyst obtained, $Ni/CoMoS_{2-x}C_x$, where x takes values from 0 to 1, is activated in atmosphere of $H_2S/H_2$ at high temperature before the hydrodesulfuration reaction.

The incorporation of an organic additive, such as a chelate complex or an organometallic complex into the impregnation solutions of the hydrodesulfurization catalysts supported on alumina promotes an optimal sulfiding of the active metallic components and a maximum promotion of the molybdenum disulfide, favoring their dispersion and creating a high density of active sites, with which an increase in the catalytic activity in hydrotreatment reactions has been achieved.

U.S. Pat. No. 6,566,296B2 refers to a catalytic composition compound of $MoO_3$ in concentrations of 10 to 30 wt. %, $WO_3$ in concentrations between 30 and 50 wt. %, NiO in concentrations between 30 and 50 wt. %, and $Al_2O_3$ in concentrations between 0 and 20 wt. %. The catalytic composition is prepared via the coprecipitation method in the salts in which at least one of the salts remains in solid state or partially dissolved; afterward, they are mixed with an alumina to form extrudes. The extrudes obtained are impregnated with an organic compound such as diethylene glycol, or an amino group substitute, $NR_4$, where R can contain up to 10 carbon atoms. Other additives that can be used as a source of carbon in the impregnation of the extrudes are glycols, saccharin, polysaccharides, and ethylenediamine tetraacetic acid (EDTA). With this strategy of incorporation of an organic compound as a source of carbon, a considerable increase in the catalytic activity of these catalysts is achieved in hydrotreatment reactions.

The addition of tungsten to the bulk catalysts of hydrodesulfuration favors their catalytic activity in comparison to the catalysts that only contain molybdenum, U.S. Pat. No. 6,534,437. The average bulk density of these catalysts is much greater than that of the conventional catalysts, which is why a greater quantity of catalytic material is required to fill a volume of a given reactor. In the case of bulk catalysts, the cost of the catalysts increases considerably, which is why new alternatives for the substitution of the molybdenum atoms by other less dense metals, such as chromium, and manganese (U.S. Pat. No. 6,635,599B1, U.S. Pat. No. 6,783, 663 B1) have been sought.

There is a range of catalysts for hydrotreatment reactions, both supported and unsupported, whose main phases are basically made up of cobalt, nickel, iron, molybdenum, and tungsten metals in their sulfided phases. However, there is also a need to supply more efficient catalytic systems in order to eliminate or reduce the level of pollutants in fuels. In this invention, a procedure for obtaining a catalytic composition of at least one Group VIII non-noble metal and at least one Group VIB metal and which, in addition, contains carbon generated by the addition of an organic compound during synthesis that favors sulfiding and catalytic activity in hydrotreatment reactions, is proposed.

The process and catalyst that are the object of this invention are used in hydrotreatment reactions that involve hydrodesulfuration, hydrodenitrogenation, and aromatic hydrogenation because these catalysts are used in the petroleum refining processes for the production of clean fuels, the elimination of sulfur and nitrogen in different hydrocarbon fractions and cuts, and for reducing the content of aromatics in fuels. They can also be employed in the hydrotreatment of heavy fractions like vacuum residue and heavy crudes.

SPECIFICATION OF THE INVENTION

This invention is related to a new, highly active, catalytic composition for hydroconversion reactions of different hydrocarbon fractions contained in petroleum, preferably for the hydrodesulfuration, hydrodenitrogenation, and aromatic hydrogenation reactions. The catalyst that is the subject of this invention consists of at least one Group VIII non-noble metallic element, at least one element from Group VIB, and one organic component as a carbon precursor, in close interaction with the active metallic phases.

Therefore, one of the goals of this invention is to obtain a catalytic composition basically made up of at least one Group VIB metal, from a precursor salt that can by molybdenum or tungsten, preferably molybdenum; soluble in a polar solvent; made up of at least one Group VIII non-noble metal, from a cobalt, nickel, iron, or ruthenium precursor salt, preferably nickel and/or cobalt; and made up of an organic compound as a carbon precursor that can be a surface active agent, such as an ionic, cationic, anionic, or neutral surfactant, or a quaternary salt from substituted ammonium ($NR_4^+$) where R can be an alkyl or aryl group composed of 1 to 8 carbons in the alkyl chain.

Another goal of this invention is to establish the procedure for obtaining catalysts, which consists in the complete solution of the precursor salts in a polar solvent, such as water, maintaining a solution pH between 5 and 14 through the addition of a base, which can be ammonium hydroxide, ammonium carbonate, or a hydroxide of a quaternary ammonium salt such as tetrabutyl ammonium hydroxide. Once the completely soluble complex is formed, an organic compound is added, in the event that the base used was not the quaternary ammonium hydroxide, which consists of a surface active agent, such as an ionic, anionic, cationic, or neutral surfactant. Afterward, the complex is crystallized through the evaporation of the excess solvent, thus obtaining a Group VIB mixed metal oxy-hydroxide and a Group VIII metal containing carbon or an organic compound.

Another goal of this invention is the thermal treatment procedure to which the material obtained must be subjected, which, under no circumstance should be subjected to oxidant gaseous atmospheres at temperatures higher than 200° C. Said procedure consists in thermal treatment at temperatures comprised between 200 and 1000° C. in an inert gas flow such as nitrogen, helium, or argon in which a nickel molybdenum mixed oxide containing carbon or a nickel molybdate containing carbon is obtained, in the event that the metals selected are molybdenum and nickel; or a cobalt molybdate, cobalt molybdenum mixed oxide containing carbon, in the event that the metals selected are molybdenum and cobalt; or a nickel mixed oxide, cobalt, and molybdenum or mixed molybdate of nickel and cobalt, in the event that two Group VIII metallic components are selected, and molybdenum.

Another goal of this invention is the sulfiding procedure for obtaining the sulfided form of the catalysts that consists of the exposure of the dry material and or material thermally treated in inert atmosphere at a temperature comprised between 200 and 600° C., in an $H_2S$ flow diluted between 0.5 and 30% in hydrogen volume. Another method consists in the direct exposure of the dry material, cobalt-nickel molybdenum oxy-hydroxide, or the thermally treated material, nickel molybdate or cobalt molybdate or nickel and cobalt molybdate, to a hydrocarbon liquid stream containing sulfur-containing organic compounds enriched with dimethyl disulfide (DMDS) at a concentration comprised between 0.1 and 5 wt. % of sulfur, at a temperature comprised between 200 and 600° C. and a hydrogen pressure comprised between 1 and 100 $Kg/cm^2$. Through this procedure, the oxidized phases of the active components are converted into the active sulfide phases. The presence of carbon favors the sulfiding, the promotion of molybdenum disulfide, and the formation of a high surface concentration of active species.

The active species included in this invention consist of sulfided phases of at least one Group VIII non-noble metal and of at least one Group VIB metal containing carbon.

Another aim of this invention is that the catalytic composition, also a goal of this invention, can be integrated or contain an inorganic material, such as binding material, for the formulation of extrudes, which can be alumina, titania, zirconia, silica, or a mixture of them, in a proportion comprised between 0 and 50% in weight as an oxide of the corresponding metal, taking the total of the oxides present as a base.

One more aim of this invention is to obtain a catalyst in extrude form with compact bulk density similar to that of the conventional catalysts supported through the integration of a low density binding material for the formulation of extrudes.

Another goal of this invention includes a hydrocarbon fraction hydrotreatment process, where the catalysts are used in their sulfided phase in contact with a liquid load of the hydrocarbon fraction under typical hydrotreatment conditions.

BRIEF DETAILED DESCRIPTION OF THE DRAWINGS

For the purpose of obtaining an understanding of the catalytic composition for petroleum fraction hydroconversion, reference will be made to the figures that are included:

FIG. 1 indicates an x-ray diffraction pattern referred to in Example 1, characteristic of the catalytic composition in its dry phase (a), thermally treated, the same that corresponds to a mixture of the nickel molybdate beta and alfa phases (b) and in its sulfided phase (c) that presents the peaks characteristic of a mixture of Group VIII and Group VIB sulfide metals, object of this invention.

Figure 2:
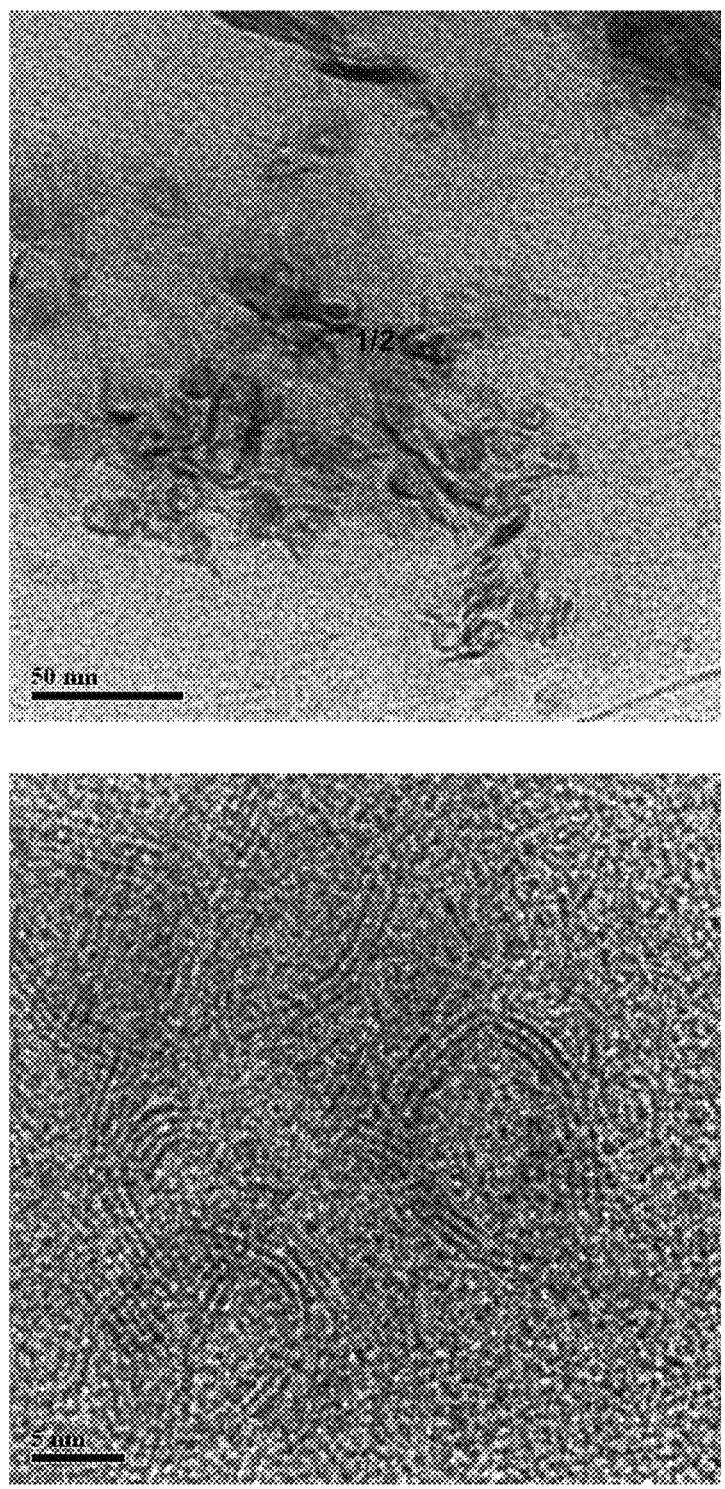

FIG. 2 exhibits the Electronic Transmission Microscopy image of the sulfided material prepared in Example 1, characteristic of the catalytic composition, object of this invention: a) Electron Microscopy image showing the morphology of Group VIB metal sulfur nanospheres with high density and Group VIII metal nanospheres, b) high resolution Electron Microscopy image showing the hollow nanospheres containing between 2 and 10 structural layers.

DETAILED DESCRIPTION OF THE INVENTION

This invention is related to a process for the preparation of a catalytic composition that is composed of at least one Group VIII non-noble metal and at least one Group VIB metal, and also an organic component as a carbon precursor in close interaction with the metals. The process includes the preparation, mixture, and reaction of the solutions that contain precursor salts with a solution that contains an organic component and its later crystallization through the elimination of the excess solvent. In order to achieve a close interaction between the metals and the organic component, all the components should be dissolved completely before beginning the crystallization process.

It is essential for the catalytic composition preparation process, subject of this invention, that all the components be dissolved completely during the addition of the solution that contains an organic compound or surface active agent. The process includes the mixture and reaction of the solutions that contain the catalyst component metals with a solution that contains an organic compound or surface active agent for the formation of a complex of the metals involved that is completely soluble in a polar solvent, the same that is later crystallized through a solvent crystallization or evaporation process. The term, "completely dissolved," in this context means that neither a suspension nor a precipitate is formed during the mixture of the precursor salt solutions that contain the surface active agent, that is, that a transparent solution is obtained.

The catalytic composition, object of this invention, comprises at least one Group VIII non-noble metal and at least one Group VIB metal. The Group VIB metals can be molybdenum, tungsten, chromium, or a mixture of them, preferably molybdenum and tungsten, and, more specifically, molybdenum. The Group VIII non-noble metals can be iron, cobalt, ruthenium, nickel, preferably nickel and cobalt. Or it can be a combination of the metals such as nickel-cobalt molybdenum, nickel-cobalt-tungsten, or nickel-cobalt-molybdenum-tungsten, or nickel-cobalt-molybdenum-tungsten-chromium, preferably nickel-cobalt-molybdenum.

The molar ratio of the Group VIB/Group VIII metals applied in the invention's process varies from 0.1 to 10, preferably from 0.4 to 2, and more specifically, from 0.5 to 1.5. When the catalytic composition includes molybdenum and tungsten as Group VIB metals, the Mo/W molar ratio varies from 10 to 1, preferably from 10 to 5. The fact that Group VIB elements are made up exclusively of molybdenum, for economic reasons, is of special consideration, since the incorporation of tungsten increases the catalyst's density and the cost of said metal is much greater than the cost of molybdenum. When the catalytic composition is made up of nickel and cobalt as in Group VIII metals, the Ni/Co molar ratio varies from 0.05 to 20, preferably from 0.1 to 10.

When water is used as the polar solvent, the Group VIB metal component's precursor salt can be: molybdenum acetylacetonate, ammonium molybdate, molybdic acid, ammonium tungstate, tungstic acid, preferably ammonium metatungstate, and/or ammonium heptamolybdate.

If water is used as the polar solvent, the Group VIII metal component's precursor salt can be: nitrate, chloride, acetylacetonates, acetate, sulfate, hydroxide, preferably nitrate and/or chloride. When the Group VIII metal refers to nickel, the precursor salt can be: nickel nitrate, nickel chloride, nickel acetate, nickel citrate, preferably nitrate and/or nickel chloride. When the Group VIII metal refers to cobalt, the precursor salt can be: cobalt nitrate, cobalt chloride, cobalt acetate, cobalt citrate, preferably nitrate and/or cobalt chloride.

The preparation of the solutions can be carried out separately, that is, each metallic component's precursor salt can be dissolved independently in a polar solvent, which can be water or alcohol or a mixture of them, and then mixed to form a solution that contains all the completely dissolved metallic components in a determined concentration for each catalytic formulation. Optionally, the solution's preparation can also be carried out through the dissolution of the precursor salts in the same container in order to form a crystalline solution that contains the metallic components involved in a completely soluble state. When a metallic component's non-soluble precursor is used, the conditions for the total digestion of the insoluble solid through the temperature increase and the addition of a base or acid should be sought in order for all the metals involved in the catalyst's synthesis to be in a completely soluble state. On the other hand, the solution that contains an organic compound or surface active agent is prepared separately, through the dissolution of a quaternary ammonium salt or an ionic or neutral surfactant, in a polar solvent such as water, alcohol, or a mixture or them.

In the preparation of the solution that contains at least one Group VIB metal's metallic component, which can be molybdenum, tungsten, and/or chromium, preferably molybdenum and tungsten and more preferably just molybdenum, this metal's precursor salt, such as ammonium heptamolybdate, molybdic acid, molybdenum acetylacetonate, molybdenum trioxide, and/or ammonium metatungstate, tungstic acid, tungsten trioxide, preferably ammonium heptamolybdate or ammonium metatungstate, is dissolved in a polar solvent.

The solution that contains at least one Group VIII non-noble metal, such as cobalt, nickel, iron, ruthenium, etc., preferably nickel and/or cobalt, is prepared through the dissolution of a precursor salt such as nitrate, chloride, acetylacetonate, acetate, sulfate, hydroxide, or nickel carbonate and/or cobalt, preferably nitrate, chloride, or acetate, in a polar solvent that may be water, alcohol, or a mixture of them.

The solution that contains the organic compound as a carbon source precursor is prepared through the dissolution of a quaternary ammonium salt or a solid surface active agent in a polar solvent. The surface active agent such as a cationic, anionic, or neutral surfactant, preferably cationic or neutral, is for achieving an optimal interaction between the anions formed by the inorganic components. The surface active agent may be a salt of a tetraalkyl ammonium ion ($NR_4^+$) where R is the alkyl group and corresponds to a saturated hydrocarbon chain or alkyl groups that can contain from 1 up to 8 carbon atoms each. All the alkyl groups can contain the same carbon number or can each be different sizes. The tetraalkyl ammonium ion may be halogenated, substituted with chlorine or bromine; or, may be hydroxylated, that is, substituted with hydroxyl groups (OH). The surface active agent may be a cationic surfactant with a larger alkyl group chain, represented by R'NR$_3$, where R' corresponds to a long chain of saturated hydrocarbons or an alkyl group containing between 12 and 20 carbons and R is the other alkyl group and corresponds to a short chain of hydrocarbons that contains between 1 and 8 carbon atoms.

The solutions that contain the metallic components and the organic compound are mixed with continuous stirring; then, a concentrated base solution is added, such as ammonium hydroxide, ammonium carbonate, and/or sodium hydroxide or potassium, preferably ammonium hydroxide, until the solution's pH rises to a value comprised between 5 and 14, preferably between 8 and 12. Then, the solution's temperature is increased to a value comprising between 50 and 200° C., preferably between 60 and 100° C., while the basic solution is added in order to maintain all the components in a completely dissolved state and it is kept in stirring for a period of time comprised between 5 min. and 24 h, preferably from 5 min to 10 h, in order to achieve a perfect interaction between all the metallic components involved and the organic compound carbon precursor. Having all the metallic species involved in a completely dissolved state in a polar solvent in the presence of an organic compound allows the maximum interaction between them and they react forming a mixed complex between the inorganic and organic components when the crystallization of the aforementioned takes place.

In the event that the polar solvent used is water, it is preferable that the reaction temperature be less than its boiling temperature, that is, between 60 and 100° C., and that the reaction take place in an open container at atmospheric pressure, or with a solvent reflux system. In the event that a higher temperature than the boiling point of water is used, the reaction should be carried out in a closed container under autogenous pressure such as an autoclave, where the crystallization of the components present in the prepared solution should be carried out under hydrothermal conditions and autogenous pressure.

It's important for the preparation process that is the object of this invention to adequately select the reaction temperature and pH in order to maintain all the metallic components involved in the preparation of the catalyst in a completely soluble state; the pH interval is from 5 to 14, preferably between 8 and 12, and more preferably between 8 and 10. The reaction time varies between 5 minutes and 24 h, preferably between 5 min and 10 h, and more preferably between 5 min and 5 h.

Once the time necessary has passed for an optimal interaction and reaction between all the components involved, the completely crystalline solution or solution in a completely soluble state passes to a crystallization process that consists of the elimination of the excess ammonium ions and the evaporation of the polar solvent, preferably water. As the excess solvent is eliminated, a precipitate is formed that may be green or purple in color depending on whether the nickel or the cobalt content is predominant. The yield of the material obtained depends on the solvent's degree of evaporation, and it is possible to obtain a yield greater than 99% if the crystallization process is adequately controlled.

The crystallization process of the solution that contains all the metals involved in the catalyst's preparation may be instantaneous or gradual and may take place in a continuous manner or in batches. For this reason, the process is viable for large scale implementation, such as in a batch reactor and/or in an evaporator.

When the crystallization is carried out through gradual evaporation, a subsequent solid-liquid separation process is required in order to recover the precipitate, which can be via filtration and/or centrifugation. Small quantities of metals remain dissolved in the mother liquor, in order to avoid losing this quantity of metals contained in the mother liquor resulting from the separation; this should recycle the process that is the object of the present invention. Once the solid material is obtained, whether it be dry or wet, it is subjected to a drying process that can be static, in a stove, or through a hot air flow or through continuous drying process in a dryer or equivalent, at a temperature comprised between 50 and 300° C., preferably between 80 and 150° C.

This invention also considers the addition of an inorganic oxide, or a mixed oxide, as a binding agent in order to produce catalysts with a geometric form, selected from a group of existing binders such as alumina, titania, alumina-titania, zeolites, silica, and silica-alumina, all of them stable supports for hydrotreatment catalysts. The term, "binder or binding agent," refers to an inorganic oxide that is capable of integrating or binding the material's particles in the form of extrudes, pellets, or spheres, in order to put them in adequate form for their use in a fixed bed catalytic process.

The addition of the binding agent can be carried out in different stages of the catalyst preparation process that is the object of this invention. If desired, it can be added in the form of the inorganic oxide's precursor salt during the dissolution of the Group VIII and Group VIB metallic elements' precursor salts. The inorganic oxide's precursor salts selected as binders are nitrates, chlorides, acetates, sulfates, hydroxides, etc. Said precursor salt will precipitate as soon as the basic solution, composed of a hydroxide and/or ammonium carbonate and/or sodium, is added. On the other hand, the addition of the binder can also be carried out once the reaction stage has been completed through the incorporation of the binding agent in powder form into the solution that contains the metallic and the organic component complex; and, afterward, the crystallization is carried out through the evaporation of the solvent in the presence of the binding agent. Preferably, the addition of the binder to the catalyst's dry crystallized particles that contain the metallic components selected from Group VIII and Group VIB can be carried out. Specifically, the binder may be dry or in a wet state peptized with an inorganic or organic acid such as nitric acid, hydrochloric acid, phosphoric acid, boric acid, sulfuric acid, citric acid, acetic acid, etc, preferably, phosphoric acid, citric acid, nitric acid, and/or acetic acid. In the event that the mixture of both parts is carried out, that is, the binder and the catalyst's particles in dry state, the binder's peptization is carried out through the addition of a diluted organic or inorganic acid. Afterward, the homogenous mixing of the wet binder particles and the catalyst is carried out in a Muller kneader until a perfectly homogenous and uniform paste is obtained with the adequate rheological properties to be extruded.

The material used as a binder or binding agent may be selected amongst the materials conventionally used as binders in the hydrotreatment catalysts. In addition, a group of oxides, hydroxides, oxy-hydroxides, etc., such as silica, silica-alumina, aluminas such as boehmite, pseudoboehmite, bayerite, gibbsite, and/or aluminum oxides such as gamma, eta, theta, and chi aluminas, zirconia, zirconia-alumina, zirconia-silica, zeolites with different structures: ZSM-5, Beta, Y, X, etc. may be selected. The silicoaluminates from the family of MCM materials can also be selected. Titania with different structures such as anatase, rutile, and brokite, mixed titanates from hydrogen and/or sodium with nanotubular and/or nanofibrillar morphology of high specific area, titania-alumina, titania-zirconia, titania-silica, etc. may also be selected. Preferably, the binders are alumina, zirconia, silica, silica-alumina and titania, and/or mixtures of these components. More preferably, they are alumina, zirconia, titania, alumina-titania, and zirconia-titania. The employment of titania such as titanium oxy-hydroxides, hydrogen titanates, and/or mixed titanates from hydrogen and/or sodium with nanofiber and/or nanoplate morphology of high specific area and low density is the special preference of this invention; and/or the employment of alumina binders, equally with nanofibrillar and/or nanoplate morphology of high area and low density. The selected binder's surface area generally varies between 20 and 700 $m^2/g$, preferably between 150 and 500 $m^2/g$, measured by nitrogen physisorption and applying the BET Method, and has pore volumes that vary from 0.05 up to 2.5 $cm^3/g$, preferably between 0.1 and 2 $cm^3/g$.

The binder's composition in the catalyst's final composition varies between 0 and 50 wt. % of the total of the catalyst's components in its oxidized form, preferably between 0 and 40 wt. %, and more preferably between 0 and 20 wt. %. Although, the binder's composition should be adjusted in function of the application in question, of the activity, and of the mechanical resistance that are desired in the final catalytic composition. The catalyst formulation process that is the object of this invention includes the formulation of extrudes, pellets, spheres, and/or microspheres, preferably the formulation of extrudes and/or pellets, in order to be applied in a fixed bed process. The extrudes formulated may be cylindrical of radial sizes comprised between 1/20 to 1/8 of an inch, or may be trilobular or tetralobular.

The extrusion process is carried out in a mechanical extruder coupled with dies with orifices of different diameters in order to prepare extrudes of different sizes, as was already indicated. Once the extrudes are obtained, these are put at rest for a period of time comprised between 5 min and 12 h, preferably between 5 min and 5 h. Afterward, they are subjected to a drying process on a stove in static air atmosphere, or through a warm air flow, at a temperature comprised between 50 and 300° C., preferably between 80 and 150° C., or in a continuous dryer with controlled atmosphere at a temperature comprised between 50 and 300° C. In this stage, the catalysts are formulated as extrudes, pellets, or spheres that may or may not be calcined in order to have them in their oxidized form. The catalyst contains an organic compound added as a surface active agent, which leaves a carbon residue upon being thermally treated, which is why it is desirable to apply a thermal treatment in order to stabilize the extrudes and give them greater mechanical strength. Under no circumstance should this be carried out in oxygen or air atmosphere. The thermal treatment should be carried out in inert atmosphere, which can be in a flow of nitrogen, argon, helium, or a mixture of them. This thermal treatment should be carried out at a temperature comprised between 200 and 1000° C., preferably between 300 and 600° C., and more preferably between 300 and 500° C., for a time comprised between 0.1 and 24 h, preferably between 0.5 and 10 h. The inert gas flow that passes through the catalytic composition catalyst during the thermal treatment is comprised between 0.01 and 5 L/g·min, preferably between 0.01 and 1 L/g·min. The dry extrudes may not be subjected to a thermal treatment and pass directly to a sulfiding stage, also an object of this invention.

The catalytic composition's preparation process, object of this invention, includes a sulfiding stage. This stage consists of putting the catalyst's particles in contact, whether it be before or after the thermal treatment in inert atmosphere, with a liquid or gaseous stream that contains sulfur compounds and a gaseous stream of hydrogen. The sulfur compounds used for the sulfiding may be hydrogen sulfide, dimethyl disulfide, carbon disulfide, thiophenes, polysulfides, benzothiophenes, or a stream of hydrocarbons that contains sulfuring organic compounds. Optionally, the sulfiding can be carried out on a catalytic composition containing dry carbon or carbon thermally treated in inert atmosphere. The sulfiding procedure in gaseous phase consists of making a flow of between 0.5 and 30 vol. % of $H_2S$, balanced with hydrogen over a fixed bed of the catalytic composition at a temperature comprised between 200 and 600° C., preferably between 250 and 500° C., in order to obtain the material in its sulfided state. The sulfiding procedure in liquid phase consists of putting the catalytic composition in contact with a liquid stream of hydrocarbons that contains between 0.1 and 5 wt. % of sulfur, such as sulfur organic compounds, or compounds enriched with DMDS, thiophenes, or $CS_2$, with a hydrogen flow at a temperature comprised between 200 and 600° C., preferably between 250 and 500° C., at a pressure comprised between 1 and 100 $Kg/cm^2$.

For its application in hydrocarbon hydrotreatment reactions in a fixed bed reactor, the sulfiding should be carried out "in situ" before or after the thermal treatment. Preferably, the sulfiding should be carried out "in situ" and directly over the dry catalytic composition that includes an organic component containing carbon and/or after having stabilized it through a thermal treatment in inert atmosphere. After the thermal treatment in inert atmosphere, the catalytic composition, object of this invention, is composed of at least one Group VIII non-noble metal and at least one Group VIB non-noble metal in its oxidized state and contains, in addition, carbon. If the Group VIB metal component is molybdenum, as is the preference of this invention, the x-ray diffraction pattern presented the characteristic peaks of a nickel and/or cobalt molybdate structure with beta and/or alfa structure or a mixture of the two phases, such as is observed in FIG. 1. If the catalytic composition is composed of tungsten and/or molybdenum, or in a high concentration of tungsten, the x-ray diffraction pattern presented wide peaks characteristic of an amorphous material, and that can not be assigned to any phase already reported in the Joint Committee on Powder Diffraction Standards (JCPDS) cards.

If the Group VIII non-noble element is nickel, and the Group VIB element is molybdenum, the x-ray diffraction shows the peaks characteristic of the nickel molybdate, in its alpha- and/or beta-phase, or it may be that the x-ray diffraction peaks correspond to both phases. In the alpha phase, the structure is monoclinic where the molybdenum is tetracoordinated in a tetrahedral symmetry, and the nickel is hexacoordinated with octahedral symmetry, while the beta-phase presents an orthorhombic structure where the molybdenum and nickel are hexacoordinated with octahedral symmetry. If the Group VIII non-noble metallic component's element is cobalt and the Group VIB metallic element is molybdenum, the x-ray diffraction peaks correspond to the cobalt molybdate in its alpha and/or beta phase, or a mixture of the two phases. When the Group VIII non-noble components consist of a mixture of nickel and cobalt, then the x-ray diffraction peaks correspond to a mixed molybdate of nickel-cobalt in alpha and/or beta phase, or a mixture of them.

After the thermal treatment in inert atmosphere, the catalysts that contain carbon, at least one Group VIII non-noble metal, and at least one Group VIB metal, presented specific areas comprised between 50 and 300 $m^2/g$, preferably between 70 and 150 $m^2/g$, pore volumes between 0.05 and 1.5 cm³/g, preferably between 0.1 and 0.7 cm³/g. The pore diameters of the catalysts after thermal treatment in inert atmosphere are comprised between 3 and 20 nm, preferably between 3 and 10 nm, determined by nitrogen physisorption.

The textural properties of the catalysts depend to a great extent on the quantity of binder or binding agent used for the formulation of the extrude in the event that said extrude is used in the catalytic composition. And in turn, the quantity of binder added depends on the activity that is desired in the catalytic composition and varies between 0 and 50% in total weight of the catalyst's components in its oxidized form, preferably between 0 and 40 wt. %, and more preferably between 0 and 20 wt. %. Although, the binder's composition should be adjusted in function of the application in question, as well as of the activity, and of the mechanical resistance that are desired in the final catalytic composition.

It is important that the catalyst's particles be uniformly and closely distributed in the binder, which acts as a binding gum for the catalyst's particles and allows them to be formulated as extrudes, pellets, and/or spheres, in such a manner that they can be evaluated in a continuous fixed bed hydrotreatment process. In this way, with the binder compositions described previously, the catalysts present a mechanical side crushing strength of at least 2 lb/mm, preferably 4 lb/mm, or greater.

In its sulfided form, the catalytic composition that is the object of this invention consists of sulfides of at least one Group VIII non-noble metal and one VIB metal and, in addition, residual carbon coming from the organic compound added during the crystallization stage. When a binder is added, in addition to the sulfides and carbon, it also consists of an inorganic oxide selected from a group of materials, or of conventional supports for hydrotreatment catalysts.

After the thermal treatment and subsequent sulfiding, or after the direct sulfiding, the catalytic composition contains carbon at a concentration comprised between 0 and 10 wt. %, preferably between 0.05 and 5 wt. %, based on the total composition of oxides and/or of sulfurs. The carbon may be present forming a kind of sulfide carbide in very low concentration, or in the form of amorphous carbon.

After a sulfiding treatment, at least 60% of the oxidized phases of at least one Group VIII non-noble metal and of at least one Group VIB metal have been sulfided, preferably at least 80% of the metals have been sulfided, and more preferably at least 95% of the metals involved in the catalytic composition have been sulfided. The presence of an organic or carbon component favors the sulfiding of the metals involved in the catalytic composition.

The catalytic composition's x-ray diffraction patterns in its sulfided phase presented crystalline peaks that can be attributed to crystalline phases from Group VIII non-noble metal sulfides and to Group VIB metal sulfides and to Group VIII and Group VIB mixed metal sulfides, as can be observed in FIG. 1(c).

It was determined through Electron Transmission Microscopy that the catalytic composition that is the object of this invention is made up of particles with a laminar structure with a great density of them curved forming fullerene nanoparticles with a stacking level between the laminae of 2 to 20 layers, as can be appreciated in FIGS. 2(a, b).

Whether it be because of direct sulfhydration of the catalytic composition or because of sulfiding of the oxidized species through a previous thermal treatment of the catalytic composition containing at least one Group VIII non-noble metal and at least one Group VIB metal, and residual carbon, the active sulfided species were evaluated as a catalyst in the hydrocarbon hydroprocessing reaction, preferably hydrodesulfuration and hydrodenitrogenation and hydrodearomatization of light and intermediate petroleum fractions.

In the specific case of this invention, light and intermediate petroleum fractions are considered to be those that include hydrocarbons whose boiling points are equal to or less than 180° C., and intermediate petroleum fractions are considered to be those that include hydrocarbons whose boiling points are equal to or greater than 180.1° C. and less than or equal to 400° C.

In the case of the hydrodesulfurization reactions, which is one of applications of this invention's catalytic composition, a dibenzothiophene (DBT) molecule model was used, without this limiting its application, since said compound represents a molecule model for hydrodesulfuration reactions of light and intermediate petroleum fractions (M. Daage and R. R. Chianelli, J. Catal. 149, 414-427 (1994)). With the goal of minimizing the exposure of the sulfided catalysts to the environment and avoiding their deactivation due to the formation of sulfated species, the sulfided material is put in contact with the hydrocarbon that contains the DBT model molecule in a glove chamber and then is loaded into an autoclave reactor. Preferably, the catalyst should be added under inert nitrogen, helium, or argon atmosphere in order to avoid its sulfation to the extent possible.

The control of the quantity of DBT in the reaction mixture to be hydrodesulfurated is carried out in a manner similar to the previous procedure. That is, a quantity of hydrocarbon is weighed on a high precision analytic scale, then the quantity of DBT that one wishes to hydrotreat is added, and then the catalyst is added, thus avoiding its exposure to the environment, in a glove chamber and in inert atmosphere.

When one wishes to hydrodesulfurize a light or intermediate petroleum fraction, the addition of the catalyst is carried out directly over 10 ml of the desired fraction, which is completed at 100 ml with an organic solvent before beginning the hydrodesulfuration reaction.

The hydrodesulfuration reaction was carried out in a three-phase reactor by autoclave batches in which the reaction mixture is added, whether it be formed by hydrocarbon used as solvent and DBT or the petroleum fraction that one wishes to hydrodesulfurate, containing the catalyst that one wishes to evaluate.

Once the reactor has been loaded, the system is pressurized with an inert gas, such as nitrogen, helium, and/or argon, preferably nitrogen, with the aim of purging the air present. Afterward, the mechanical stirring was begun between 100 and 2000 rpm, preferably between 800 and 1500 rpm, with the goal of eliminating the presence of internal diffusion effects. Afterward, the reactor's temperature was elevated to the final operating temperature in the interval of 300 to 400° C., preferably between 320 and 360° C. Finally, the operating pressure was adjusted through the addition of hydrogen between 40 and 100 kg/cm², preferably between 50 and 70 kg/cm².

Once the reaction conditions described in the previous paragraph were reached, the catalytic evaluation through frequent samplings was carried out with the purpose of determining parameters such as the conversion, reaction speed, selectivity, and yield. For this reason it was considered a pseudo-first order reaction model with respect to the reacting hydrocarbon, and zero order with respect to the hydrogen due to the fact that it was fed a great excess of the latter. For the identification and quantification of the products resulting from the reaction, the liquid samples taken were analyzed in a chromatograph with Varian 3400 CX gases equipped with a flame ionization detector and an Ultra 2 Capillary Column (Crosslinked 5% Ph Me Silicone). When a real load is used, the total concentration of sulfur was determined in an HP sievers gas chromatograph, equipped with a chemiluminescence detector (SCD) and a capillary column. The catalytic activity was determined through the calculation of the specific velocity constant of reaction (K) on the formulations of catalysts that are the object of this invention, which is defined in [L/g·s].

For comparison purposes, the catalytic activity of a commercial catalyst was determined, based on the same active components deposited on a high specific area support with an alumina base, on which the reaction's specific velocity constant was determined. This determination was used as the reaction's velocity constant of a reference catalyst, and was named as the reference constant that served to determine the relative activity of the catalysts that are the object of this invention, defined as the ratio between the catalyst's activity and the reference catalyst's activity. Said ratio is the reaction velocity constant of a catalyst divided between the reaction's reference constant over a commercial reference catalyst.

In the cases in which the reaction was carried out with DBT as the hydrodesulfuration reaction model molecule, the catalytic formulations, objects of this invention, presented selectivity comprised between 30 and 40% toward the formation of biphenyl (BP) between three and four hours of reaction, and a selectivity between 60 and 70% toward ciclohexyl phenyl (CHP) and biciclohexyl (BCH) as hydrogenation products of the aromatic rings that make up the BP, which indicates that these catalysts possess a high hydrogenating capacity. Said hydrogenating capacity was determined through the ratio of reaction product selectivities dividing the CHP selectivity plus the BCH selectivity by the BP selectivity $[(S_{CHP}+S_{BCH})/S_{BP}]$; the hydrogenating capacity of the catalysts that are the object of this invention turned out to be superior to that of the conventional catalysts based on the same metals supported on alumina. It was demonstrated that the presence of carbon in the catalytic composition favors not only the hydrodesulfuration's rate, but also the material's hydrogenating capacity. When a binder is added to the catalytic composition containing carbon, object of this invention, the hydrodesulfurating capacity declines slightly; however, its hydrogenation capacity diminishes drastically. The ratio of selectivities $[(S_{CHP}+S_{BCH})/S_{BP}]$ comprised between 1 and 3, preferably between 1.5 and 2.5, diminishes to a value comprised between 0.05 and 0.5. Generally, in the commercial catalysts based on the same metals this ratio is comprised between 0.1 and 0.3.

Additionally, the presence of carbon in the catalytic composition of at least one Group VIII non-noble metal and at least one Group VIB metal, containing a binder or binding agent, favors its desulfuration capacity and promotes its hydrogenating capacity. Therefore, the presence of carbon in the catalytic composition that is the object of this invention turns out to be of vital importance in order to access high performance catalysts that achieve deep hydrodesulfuration levels and fuels of very low sulfur content.

Finally, in Example 12 the hydroprocessing capacity of this invention's catalytic composition is demonstrated for a primary light gas oil (PLGO) with a high nitrogen content, between 250 and 500 ppm, whose properties are shown in Table 3. The catalytic composition that is the object of this invention presented a catalytic activity approximately 5 times greater than the catalytic activity of a conventional commercial catalyst with the same metallic components supported on alumina, as indicated in Table 4. The sulfur content of the product obtained diminished to levels inferior to 30 ppm in sulfur weight, when the evaluation was carried out at a spatial velocity of 2.5 $h^{-1}$, while when the spatial velocity diminished to 1.5 $h^{-1}$ the sulfur content in the fraction of the product diminished to levels inferior to those of 10 ppm in weight. Therefore, the application of the catalytic composition that is the object of this invention in the hydrodesulfuration of light and intermediate fractions represents an alternative for achieving ultra-low sulfur fuels.

EXAMPLES

Example 1

11.93 g of ammonium heptamolybdate $[(NH_4)_6Mo_7O_{24}]$, 21.18 g of nickel nitrate $[Ni(NO_3)_2 \cdot 6H_2O]$, and 0.33 g of cetyl trimethyl ammonium bromide (CTAB) are dissolved in 150 ml of deionized water. A green-colored crystalline solution is obtained with a pH between 4 and 6; afterward, a 28 vol. % ammonium hydroxide solution is added, approximately 125 ml, until reaching a pH between 8 and 10; the solution remains crystalline and its coloration changes from green to blue. Then, the solution is heated to a temperature of 79-90° C., allowing the evaporation of the excess water (125 ml) and the formation of a green precipitate. The suspension formed presents a pH of 7.3. The material obtained is filtered, washed with an abundant amount of deionized water, and dried at 120° C. for a period of 18 hours.

The material obtained in powder form presented a crystalline structure characteristic of a mixed ammonium oxyhydroxide of molybdenum and nickel whose formula is expressed as follows: $(NH_4)HNi_2(OH)_2(MoO_4)_2$, see FIG. 1(a).

Then, 5 g of the material made up of the ammonium oxy-hydroxide of molybdenum and nickel containing the organic compound were sulfided directly at 400° C., in a quartz tube making a flow of 100 ml/min from a mixture of gases made up of 10 vol. % of $H_2S$ and 90 vol. % of $H_2$ for 2 hours. Afterward, the solid was allowed to cool at room temperature. In its sulfided phase, the material presented a mixture of crystalline phases made up of $Ni_{2.5}Mo_6S_{6.7}$ and $NiS_{1.19}$ (see FIG. 1(c)). The mixed sulfide of molybdenum and nickel obtained presented a fullerene morphology, that is, it is made up of nanospheres with dimensions comprised between 5 and 20 nm, with a stacking level between the layers comprised between 2 and 10 structural layers.

One part of the sulfided material in powder form (80:100 Tyler mesh) was evaluated in the dibenzothiophene (DBT) hydrodesulfurization reaction, avoiding its exposure to the environment to the maximum extent possible. 100 ml of a solution prepared with 0.3 g of DBT dissolved in 100 ml of n-hexadecane were placed in a 500 ml autoclave to which 0.2 g of the sulfided material was added as a catalyst. The reactor was sealed and purged with inert gas. Afterward, the temperature was increased to 320° C. at a heating rate comprised between 2 and 20° C./min and the hydrogen pressure was adjusted to 56 Kg/cm². It was allowed to react for a period comprised between 4 and 6 hours, taking an aliquot from the reaction mixture every 30 minutes for its analysis by gas chromatography. In Table 1 it is observed that at the end of 4 hours of reaction the DBT conversion turned out to be 96% and its reaction rate constant was $1.48 *10^{-4}$ 1/g.s.

The selectivity toward biphenyl (BP) turned out to be 32.75 mol %, while the selectivity toward products like cyclohexyl phenyl (CHP) and bicyclohexyl (BCH) turned out to be greater than 67.25%. This high selectivity toward CHP and BCH indicates that this catalyst possesses a high hydrogenating capacity. The hydrogenating capacity of this catalyst was determined through the ratio of selectivities from the reaction products dividing the CHP selectivity plus the BCH selectivity between the selectivity of BP [($S_{CHP}$+$S_{BCH}$)/$S_{BP}$]; said ratio turned out to be greater than 2.05, which indicates a high hydrogenating power.

Another fraction of the sulfided material was evaluated as a catalyst in the hydrodesulfuration of a primary light gas oil (PLGO) in an autoclave. For this experiment, 20 ml of PLGO with the characteristics reported in Table 1 were diluted in 80 ml of hexadecane; this mixture was placed in a 500 ml autoclave reactor, adding 2 g of the sulfided material as a catalyst, strained to a particle size comprised between 80-100 Tyler mesh. The reactor was sealed, purged with nitrogen, and then the temperature was increased to 350° C. at a heating rate comprised between 2 and 20° C./min. Once the temperature was reached, the hydrogen pressure was adjusted to 70 Kg/cm$^2$ and it was allowed to react for 6 hours. The initial concentration of sulfur in the reaction mixture was around 2688 ppm, and after the 6 hours of reaction, the reaction's liquid product contained 35 ppm of sulfur. The reaction rate constant determined for this evaluation was $3.42*10^{-6}$ L/g.s.

Example 2

In order to evaluate the influence of the surface active agent added as a residual carbon precursor in the catalytic composition, the material prepared in Example 1 was calcined at a temperature of 400° C., in air atmosphere. The oxidized phase of the material obtained presented a crystalline structure corresponding to the β-NiMoO$_4$ phase, and a small quantity of α-NiMoO$_4$ phase (see FIG. 1(b)) whose morphology consists in nanoparticles of the nickel molybdenum mixed oxide and presented a BET surface area of 105 m$^2$/g, an average pore volume of 0.18 cm$^3$/g, and an average pore diameter of 6.9 nm.

The material in its oxidized form is subjected to a sulfiding treatment. In order to do this, it is heated at a rate of 4° C./min until reaching 400° C., in a quartz tube using a nitrogen flow of 100 ml/min. Once reaching 400° C., the nitrogen flow is changed for a mixture of gases composed of 10 vol. % of H$_2$S and 90 vol. % of H$_2$ and is maintained for 2 hours.

A portion of the sulfided material in powder form (80:100 Tyler mesh) was evaluated in the hydrodesulfuration reaction of dibenzothiophene (DBT), avoiding its exposure to the environment to the maximum extent possible. 100 ml of a solution prepared with 0.3 g of DBT dissolved in 100 ml of hexadecane were placed in a 500 ml autoclave, to which 0.2 g of the sulfided material were added as a catalyst. The reactor was sealed and purged with inert gas. Afterward, the temperature was increased to 350° C. at a heating rate comprised between 2 and 20° C./min and the hydrogen pressure was adjusted to 56 Kg/cm$^2$. It was allowed to react for a period comprised between 4 and 6 hours, taking an aliquot from the reaction mixture every 30 minutes for its analysis by gas chromatography. As can be observed in Table 1, at the end of 4 hours of reaction, the DBT conversion turned out to be 87% and its reaction velocity constant was $9.34*10^{-5}$ L/g.s. These results were significantly less than those reported in Example 1, where there was no calcination or oxidation treatment, and the organic compound included in Example 1, formed residual carbon in the inert atmosphere heat-treatment procedure.

The selectivity toward biphenyl (BP) turned out to be 35.52% mol, while the selectivity toward products like cyclohexyl phenyl (CHP) and bicyclohexyl (BCH) turned out greater than 64.48 mol %. This high selectivity toward CHP and BCH indicates that this catalyst possesses a high hydrogenating capacity of 1.82, determined in the same manner as in Example 1; however, this value was lower than the value observed in Example 1, where the catalytic composition contains residual carbon.

It can be deduced from the comparison of Examples 1 and 2 that the addition of a surface active agent as a residual carbon precursor in the catalyst favors and promotes the desulfuration rate and the hydrogenating capacity of the catalysts.

Example 3

This example follows the same methodology described in Example 1. In this example, a material was prepared without the addition of a carbon precursor organic component. The quantities of the salts used for this example where the same as in Example 1, without addition of CTAB as a surface active agent. The resulting precipitate is filtered and washed with an abundant amount of deionized water.

The dry material obtained presented the same crystalline structure as in Example 1, corresponding to an ammonia complex of nickel-molybdenum oxy-hydroxide, such as is presented in FIG. 1.

The material was sulfided directly with the procedure described in Example 1. The material in powder form was evaluated as a catalyst, following the procedures described in Example 1 in the hydrodesulfuration reaction of DBT, obtaining a conversion of 96 mol % during the 6 hours of reaction with a reaction rate constant of $1.02*10^{-4}$ L/g.s. Therefore, this catalyst turned out to have an activity that was 50% less than that obtained in Example 1 with a composition in which a residual carbon precursor surface active agent was added, and very similar catalytic activity with regards to Example 2 where the carbon has been eliminated through calcination at 400° C. in air atmosphere. The importance of the addition of the surface active agent as a residual carbon precursor during the catalyst's preparation is deduced from this comparison.

The evaluation with PLGO was carried out under the same conditions as in Example 1. After 6 h of reaction, a final product was obtained with a sulfur content lower than 48 ppm in weight and the reaction rate constant was $2.85*10^{-6}$ l/g.s, lower than that observed in the same test in Example 1.

Example 4

The dry material obtained in Example 3 was calcined in air atmosphere following the same procedure described in Example 2. In its oxidized phase, the material presented the same crystalline structures reported in Example 2; however, the BET surface area was 92 m$^2$/g, the pore volume was 0.132 cm$^3$/g, and the average pore diameter was 5.1 nm. The material in its oxidized form is subjected to a sulfiding treatment. To do this, it is heated at a rate of 4° C./min, until reaching 400° C., in a quartz tube with a nitrogen flow of 100 ml/min. Once the 400° C. are reached, the nitrogen flow is changed for a mixture of gases composed of 10 vol. % of H$_2$S and 90 vol. % of H$_2$ and is maintained for 2 hours. One part of the sulfided material in powder form (80:100 Tyler mesh) was evaluated in the hydrodesulfuration reaction of dibenzothiophene (DBT), avoiding its exposure to the environment to the maximum extent possible, through the procedure and the conditions described in Example 1.

As can be observed in Table 1, at the end of 4 hours of reaction the DBT conversion turned out to be 89% and its reaction rate constant was $7.5*10^{-5}$ L/g.s. These results were significantly lower than those reported in Examples 1 and 3, where there was no calcination treatment, and significantly inferior to that of Example 2 with similar calcination treatment where the organic compound added during the mixing and reaction stage in the synthesis has been eliminated. However, the distribution of product selectivities was practically identical to that obtained in Example 3, as can be appreciated in Table 1. That is to say, both catalysts presented the same hydrogenating capacity due to the fact that in this case there was no organic compound precursor to eliminate during the calcination.

Example 5

In this example, a catalyst was prepared through the precipitation of the nickel molybdenum mixed oxy-hydroxide in the presence of a binder or binding agent. An alumina in its boehmite phase was used with a surface area of 243 m$^2$/g, an average pore volume of 0.336 cm$^3$/g, and an average pore diameter of 5.54 nm. For this, just as in Example 1, 11.93 g of nickel nitrate, 21.18 g of ammonium heptamolybdate, and 0.33 g of a surface active agent (CTAB) were dissolved in 150 ml of water (pH=5). The solution acquired a green color, then this solution was heated to 90° C. and 125 ml of ammonium hydroxide (pH=10) were added; the crystalline solution acquired a blue coloration. This solution was maintained for a period of 30 minutes heating to 90° C.; afterward, 6825 g of boehmite (Catapal) were added. In order to remove the water by evaporation, the solution with the added boehmite continued heating for approximately three hours at the temperature indicated earlier until a change in color from blue to green, and then to a light green, was noticed. The precipitate obtained was left to cool at room temperature and was washed with distilled water 4 times, 600 ml each wash. Finally, the product obtained was dried at a temperature of 120° C. for 18 hours.

Afterward, the material was calcined in accordance with the procedure described in Example 1. In its oxidized phase, the material exhibits a diffraction pattern characteristic of the gama-alumina. The catalyst in its oxidized phase contains 16.4% weight of MoO$_3$, 7.17% weight of NiO, and 76.4% weight of Al$_2$O$_3$. This material exhibits a specific area measured by nitrogen physisorption of 271 m$^2$/g, pore volume of 0.31 cm$^3$/g, and a pore diameter of 4.5 nm.

A portion of the dry material is sulfided directly in accordance with the procedure described in Example 1 in order not to eliminate the carbon precursor organic compound. Its catalytic activity was evaluated in the DBT hydrodesulfuration reaction in accordance with the methodology described in Example 1. At the end of 4 h of reaction, it presented a conversion of 98% and a catalytic activity toward hydrodesulfuration of $1.27*10^{-4}$ L/g.s.

The selectivity toward BP turned out to be 79.07% mol while the selectivity toward the hydrogenated products CHP and BCH turned out to be 20.93% mol. The hydrogenating capacity was determined as in Example 1, through the ratio of selectivities $[(S_{CHP}+S_{BCH})/S_{BP}]$, was 0.26, much less that that observed in Example 1. Although the hydrodesulfuration rate was high, its hydrogenating capacity turned out to be low, compared with Examples 1 through 4, where the catalytic composition does not contain a binder.

Example 6

Example 6 was carried out in accordance with the methodology described in Example 5. In this case, the surface active agent was not added during the preparation of the ammonium heptamolybdate salts and nickel nitrate solution. The crystallization was carried out in the presence of a binder, the same one used in Example 5.

A portion of the material was calcined in air atmosphere in order to obtain the material in its oxidized phase. This material's x-ray diffraction pattern mainly exhibits the peaks characteristic of the gama-alumina. In its oxidized phase, the material contains approximately 16.4% weight of MoO$_3$, 7.2% weight of NiO, and 76.4% weight of Al$_2$O$_3$. The specific area determined by nitrogen physisorption turned out to be 260 m$^2$/g, with an average pore volume of 0.29 cm$^3$/g, and a pore diameter of 4.5 nm. In comparison with Example 5, this material presented greater specific surface when it was prepared in the presence of a surfactant or surface active agent.

A portion of the material was sulfided directly in accordance with the procedure described in Example 1. Its catalytic activity was evaluated in the DBT hydrodesulfuration reaction in accordance with the methodology described in Example 1. After 4 h of reaction, this material presented a conversion of 97% and a DBT hydrodesulfuration rate constant of $1.06*10^{-4}$ L/g.s. The selectivity toward BP was 89.04% and the selectivity toward hydrogenation products, CHP and BCH, turned out to 10.96%. The catalytic activity of this material turned out to be inferior to the equivalent that contains residual carbon from Example 5. Also, its hydrogenating capacity diminished to 0.12, since it presents less selectivity toward hydrogenation products like CHP and BCH. The comparison of Examples 5 and 6 provides more evidence that the incorporation of an organic compound, such as a surfactant or surface active agent into the synthesis favors the hydrodesulfuration rate and promotes the hydrogenating capacity of the materials, even when these are incorporated into a binder.

Example 7

This example corresponds to the evaluation of the catalytic activity of a commercial catalyst, based on the same metals as the catalytic composition that is the object of this invention, supported on a conventional alumina for hydrodesulfuration catalysts. The evaluation of the catalytic activity was carried out in the DBT hydrodesulfuration reaction following the procedure described in Example 1.

After 4 h of reaction, the DBT conversion was 96%, and presented a reaction rate constant of $1.12*10^{-4}$ L/g.s. The selectivity toward hydrogenation products, basically toward CHP, was 9.53% while 90.47% corresponded to the selectivity toward BP. Its hydrogenating capacity, measured as the selectivity ratio $[(S_{CHP}+S_{BCH})/S_{BP}]$, was barely 0.1.

Example 8

Following the methodology described in Example 1, a material was prepared substituting the nickel salt for a cobalt salt. In order to do this, 11.93 g of ammonium heptamolybdate, 21.18 g of cobalt nitrate [Co(NO$_3$)$_2$.6H$_2$O], and 0.33 g of cetyl trimethyl ammonium bromide (CTAB) were used.

The precipitate obtained presented the same structure as the materials based on nickel; only in this case, an ammonium complex resulted from a mixed oxy-hydroxide of cobalt-molybdenum, $(NH_4)HCo_2(OH)_2(MoO_4)_2$. The resulting material was sulfided directly through the sulfiding procedure described in Example 1. The resulting sulfided material is made up of a mixture of sulfided phases of the metallic components $MoS_2$, $Co_xMo_yS_z$, and $Co_4S_3$. For this example, the material in powder form (80:100 Tyler mesh) was sulfided directly and its catalytic activity was determined in an autoclave reactor with a primary light gas oil (PLGO) diluted in hexadecane at 20% in volume, just as is described in Example 1, only that in this case the operating pressure during the reaction was less (56 Kg/cm$^2$). In this reaction, a product with 79 ppm in weight of sulfur was obtained after 6 h of reaction, and the reaction rate constant was $2.19*10^{-6}$ l/g.s.

Example 9

A material was prepared following the procedure described in Example 1. In order to do this, the same quantity of ammonium heptamolybdate (11.93 g) was used, dividing the quantity of the second metal salt into two, 10.6 g of nickel nitrate and 10.6 g of cobalt nitrate. The same methodology was followed, obtaining a consistent precipitate of mixed nitrate of cobalt, nickel, and molybdenum. The precipitate was washed and dried as in Example 1.

The solid obtained presented the mixed oxy-hydroxide structure of nickel, cobalt, and molybdenum with ammonia such as: $(NH_4)HCoNi(OH)_2(MoO_4)_2$. The material with said structure was sulfided directly through the procedure described in Example 1, and its catalytic activity in powder form (80:100 mesh) was evaluated in the hydrodesulfuration of a hydrocarbon fraction (PLGO), using a diluted PLGO such as is described in Example 1. In this reaction a product with 106 ppm of sulfur was obtained, with a reaction rate constant of $1.84*10^{-6}$ L/g.s.

Example 10

For the purpose of observing the influence of the concentration of the surface active agent added during the synthesis, in the two following examples the quantity of surface active agent incorporated was varied. A material was prepared following the procedure described in Example 1, using the same quantities of precursor salts and of solvent; only the quantity of the surfactant added was varied, which was 1.65 g of CTAB. The precipitate was washed and dried as in Example 1.

The solid obtained presented the structure of a mixed oxy-hydroxide of nickel, cobalt, and molybdenum with ammonia such as: $(NH_4)HNi_2(OH)_2(MoO_4)_2$. The material with said structure was sulfided directly through the procedure described in Example 1 and its catalytic activity in powder form (80:100 Tyler mesh) was evaluated in the PLGO hydrodesulfuration, using a diluted PLGO such as is described in Example 1. The results are presented in Table 2. In this reaction, a product with 43 ppm of sulfur was obtained, with a reaction rate constant of $3.02*10^{-6}$ L/g.s, slightly less than that observed for Example 1. However, it presented very high activity.

Example 11

Following the same procedure described in Example 1 and with the same objective as in Example 10, the quantity of surfactant was increased in this example to 3.3 g of CTAB, using the same quantities of salts and of solvents as in Example 1.

The material obtained presented the same structure as that obtained in the previous examples with the corresponding metals.

The resulting material was sulfided directly through the procedure described in Example 1 and its catalytic activity in powder form (80:100 Tyler mesh) was evaluated in the hydrodesulfuration of a hydrocarbon fraction (PLGO), using a diluted PLGO such as is described in Example 1. The results are presented in Table 2. In this reaction, a product with 40 ppm of sulfur was obtained, with a reaction rate constant of $3.08*10^{-6}$ L/g.s, slightly less than that observed for Example 1, and very similar to the activity of the material synthesized in Example 10. By comparing the results obtained in the evaluation of the materials prepared in Examples 1, 10, and 11, it can be deduced that the quantity of surface active agent does not influence the hydrodesulfuration speed in a significant manner, which is probably due to the fact that the synthesis process includes a washing stage and only the organic compound that interacts strongly with the anions of the metals involved remains in the solid, and the concentration of the anions does not vary with the increase in the concentration of the surfactant.

Example 12

A catalytic composition was prepared in accordance with the procedure described in Example 1. The precipitate obtained, nickel-molybdenum oxy-hydroxide, was mixed with a 20 wt. % of alumina boehmite, based on the total weight of the catalytic composition. Afterward, an aqueous solution of 3% weight of nitric acid dissolved in distilled water was added in such a way that a paste was obtained. The wet paste was left to stand in a closed container and then it was extruded. The resulting extrude was dried at 120° C. in accordance with the procedure described in Example 1.

The extrudes were thermally treated in nitrogen atmosphere, at 400° C., in order to achieve the elimination and possible carbonization of the organic compound CTAB added during the mixture and reaction of the solutions in the synthesis process. The resulting catalytic composition contains 16% weight of $Al_2O_3$, 55% weight of $MoO_3$, and 37% weight of NiO, and less than 1.5% of carbon. After the thermal treatment in inert atmosphere, the catalytic composition presented a specific area of 135 m$^2$/g, an average pore volume of 03 cm$^3$/g, and an average pore diameter of 6 nm.

One part of this material was evaluated in a fixed bed plant and continuous flow operated at pressure, where 5 ml of the material (4.5 g) were packed in a reactor of 1.4 cm in diameter and 48 cm in length. Afterward, the catalysts were sulfided making a hydrocarbon fraction pass through (primary light gas oil, PLGO), whose characteristics are presented in Table 3, to which dimethyl disulfide (DMDS) was added in order to increase the content of S by 10 000 ppm. In this manner, the final total sulfur content is approx. 2.5 wt. % weight. The sulfiding was carried out at a pressure of 27 kg/cm$^2$. The space velocity (LHSV) used for the sulfiding was 1.5 h$^{-1}$ and the H$_2$/hydrocarbon ratio of 333 m$^3$/m$^3$. The catalytic bed temperature was increased from room temperature to 135° C. at a rate of 40° C./h. Then, it was changed to 28° C./h up to 343° C. and was stabilized for 3 h. Afterward, the system was carried at conditions of pressure, space velocity, and H$_2$/hydrocarbon ratio similar to the evaluation conditions (70 kg/cm$^2$, LHSV=2.5 h$^{-1}$, and 445 m$^3$/m$^3$) feeding the hydrocarbon feedstock to be hydrotreated (PLGO), and was left to stabilize for 96 h at 343° C. Then, the temperature was raised to the first from the evaluation period (350° C.), operating in this manner until the S content in the slurry (Antek analyzer and gas chromatograph with chemiluminescence detector) is considered essentially constant. Once the aforementioned has been accomplished, the reactor is carried to the next temperature to be evaluated.

TABLE 1

Catalytic activity in the DBT hydrodesulfuration reaction.

| Examples | $X_{DBT}$ (mol %) | $S_{BF}$ (mol %) | $S_{CHF}$ (mol %) | $S_{BCH}$ (mol %) | $(S_{CHF} + S_{BCH})/S_{BF}$ | K L/g · s |
|---|---|---|---|---|---|---|
| 1 | 96 | 32.75 | 62.64 | 4.61 | 2.05 | 1.48 |
| 2 | 87 | 35.52 | 60.10 | 4.38 | 1.81 | 0.94 |
| 3 | 96 | 38.40 | 57.41 | 4.19 | 1.60 | 1.02 |
| 4 | 89 | 38.06 | 58.70 | 3.24 | 1.63 | 0.75 |
| 5 | 97 | 89.04 | 10.60 | 0.36 | 0.12 | 1.02 |
| 6 | 98 | 79.07 | 20.50 | 0.43 | 0.26 | 1.27 |
| 7 (Commercial) | 97 | 90.57 | 9.43 | 0.0 | 0.10 | 1.12 |

TABLE 2

Catalytic activity in the hydrodesulfuration reaction of a PLGO gas oil in a batch reactor. The initial sulfur concentration in the reaction mixture was 2688 ppm in weight.

| Examples | Content of S in product (wppm in weight) | Reaction Rate Constant (K) * $10^6$ (L/g · s) |
|---|---|---|
| 1 | 35 | 3.4 |
| 3 | 48 | 2.85 |
| 8 | 79 | 2.19 |
| 9 | 106 | 1.84 |
| 10 | 43 | 3.02 |
| 11 | 40 | 3.08 |

TABLE 3

Specification of the gas oil (PLGO) used for the catalytic activity in the examples from this invention.

| Properties | Result | Method |
|---|---|---|
| Specific Weight | 0.8507 (g/mL) | ASTM D-4052 |
| Cetane Number | 50 | ASTM D-976 |
| Compounds Present | | |
| Total Sulfur | 14429 ppm weight | |
| Total Nitrogen | 263 ppm weight | |
| Basic Nitrogen | 107 ppm weight | |
| Total Aromatics | 31.7% weight | |
| Monoaromatics | 14.4% weight | |
| Dichromatics | 12.8% weight | |
| Poliaromatics | 4.5% weight | |

Specification of the gas oil (PLGO) used for the catalytic activity tests in the examples of this invention.

| Properties | Result | Method |
|---|---|---|
| Atmospheric Distillation | | |
| Initial Boiling Temp. | 214.8° C. | |
| 5% | 240.1 | |
| 10% | 251.6 | |
| 15% | 259.0 | |
| 20% | 265.2 | |
| 30% | 273.9 | |
| 40% | 282.4 | |

TABLE 3-continued

| 50% | 291.5 |
| 60% | 301.3 |
| 70% | 312.9 |
| 80% | 326.5 |
| 90% | 344.2 |
| 95% | 357.7 |
| Final Boiling Temp. | 376.5 |

TABLE 4

Catalytic activity in HDS of PLGO, of the catalyst prepared as is described in Example 12 and a commercial catalyst.

| | | S in product | | | |
|---|---|---|---|---|---|
| Example | LHSV ($h^{-1}$) | 330° C. | 340 | 350 | 360 |
| 12 | 2.5 | — | 206 | 25 | 5 |
| 12 | 1.5 | 730 | 25 | 8 | — |
| 7 (comp.) | 2.5 | 1146 | 760 | 428 | — |

What is claimed is:

1. A catalytic component consisting of at least one Group VIII non-noble metal, a single Group VIB metal and carbon, said catalytic component obtained by the process of reacting a solution of at least one soluble Group VIII metal precursor, a single soluble Group VIB metal precursor and a tetraalkyl quaternary ammonium salt at pH 5-14;

evaporating the solution to form a crystallized complex; thermally treating the crystallized complex; and sulfiding the thermally treated crystallized complex to obtain the catalytic component wherein said catalytic component consists of at least one Group VIII metal sulfide, a Group VIB metal sulfide, and a surface area of 50 to 300 $m^2/g$, a pore volume of 0.05 to 2.5 $cm^3/g$ and a pore diameter of 2-20 nm, and carbon in an amount of up to 5 wt. % based on the total weight of the Group VIII metal sulfide and Group VIB metal sulfide.

2. The catalytic component of claim 1, wherein said tetraalkyl quaternary ammonium salt is a carbon precursor and is included in an amount to provide a carbon content of up to 5 wt % based on the weight of the Group VIII non-noble metal sulfide and the Group VIB metal sulfide.

3. The catalytic component of claim 2, wherein the carbon is present in an amorphous state in an amount of 0.05 and 5 wt. % based on the total weight of the Group VIB and Group VIII metal sulfides.

4. The catalytic component of claim 2, wherein the carbon is present as carbides in an amount of 0.05 and 5 wt. % based on the total weight of the Group VIB and Group VIII metal sulfides.

5. The catalytic component of claim 1, wherein said catalytic component comprises fullerene nanoparticles with a laminae of 2 to 20 layers.

6. The catalytic component of claim 1, wherein said tetraalkyl quaternary ammonium salt is a carbon precursor and is included in an amount to provide carbon in the catalytic component in an amount of 0.05 wt % to 5.0 wt % based on the total weight of the Group VIB and Group VIII metal sulfides.

7. The catalytic component of claim 1, wherein the Group VIB and Group VIII metal sulfides have a surface area of 70 to 150 m2/g, a pore volume of 0.1 to 0.7 cm3/g, and a pore diameter of 3-10 nm.

8. A catalyst comprising a catalytic component consisting essentially of at least one Group VIII non-noble metal sulfide, a single Group VIB metal sulfide and carbon, and a surface area of 50 to 300 m2/g, a pore volume of 0.05 to 2.5 cm3/g and a pore diameter of 2-20 nm, said catalytic component obtained by the process comprising:

a) forming a solution of precursor salts in a solvent selected from the group consisting of water, methanol, ethanol, propanol, butanol, and mixtures thereof, said precursor salt being salts of at least one Group VIII non-noble metal and a single Group VIB metal;

b) forming a solution of a tetraalkyl quaternary ammonium salt carbon precursor in a solvent;

c) forming a mixture of the solutions obtained in steps (a) and (b);

d) adding a basic hydroxide solution and/or ammonium carbonate to the solution (c) at a pH between 5 and 14;

e) heating the solution obtained in step (d) to a temperature between 50 and 200° C.;

f) homogenizing the solution in step (e);

g) crystallizing the solution obtained in step (f) through evaporation of the solvent;

h) filtering or centrifugation of the resulting crystallized suspension obtained in step (g) for the separation of the crystals and recovery of mother liquors in the event that the evaporation has not been completed;

i) washing the solid obtained in step (h) with sufficient deionized water and/or water/alcohol mixture;

j) drying the solid obtained in step (i) at a temperature between 50 and 300° C.;

k) thermally treating the solid obtained in step (j) in inert atmosphere of nitrogen, helium, or argon, at a temperature between 200 and 1000° C.;

l) sulfiding of the material obtained step (i) or in step (j) in a gas flow made up of 10 vol. % hydrogen sulfide or with a hydrocarbon fraction containing at least 0.2 wt. % sulfur under a hydrogen flow at a temperature between 200 and 600° C., and a pressure between 1 and 100 Kg/cm2 to obtain said catalytic component.

9. The catalyst in accordance with claim 8, where the Group VIII non-noble metal is selected from the group consisting of nickel, cobalt, and/or iron, and mixtures thereof.

10. The catalyst in accordance with claim 9, where the nickel and/or cobalt represent 100 wt. % of the Group VIII non-noble metals calculated as oxides.

11. The catalyst in accordance with claim 8, where the Group VIB metal is one selected from the group consisting of molybdenum, tungsten and chromium.

12. The catalyst in accordance with claim 8, further comprising an inorganic oxide binder selected from the group consisting of alumina, silica, titania, silica-alumina, alumina-titania, zirconia, zirconia-titania, zirconia-alumina, amorphous silico-aluminates, and/or crystalline clays in the homogenization step of the mixture of precursor salts.

13. The catalyst in accordance with claim 8, further comprising the addition of an inorganic oxide binder, after the crystallization stage in the wet and/or dry material.

14. The catalyst in accordance with claim 8, further comprising the addition of an inorganic oxide as a binder, after the material has been thermally treated and/or sulfided.

15. The catalytic component of claim 8, wherein said tetraalkyl quaternary ammonium salt carbon precursor is included in an amount to provide a carbon content of up to 5 wt % based on the weight of the Group VIII non-noble metal sulfide and the Group VIB metal sulfide.

* * * * *